(12) United States Patent
Iida

(10) Patent No.: US 7,259,913 B2
(45) Date of Patent: Aug. 21, 2007

(54) FARADAY ROTATOR FOR HIGH OUTPUT LASERS

(75) Inventor: Junji Iida, Tokyo (JP)

(73) Assignee: Sumitomo Metal Mining Co. Ltd., Tokyo (JP)

( * ) Notice: Subject to any disclaimer, the term of this patent is extended or adjusted under 35 U.S.C. 154(b) by 0 days.

(21) Appl. No.: 11/347,431

(22) Filed: Feb. 6, 2006

(65) Prior Publication Data
US 2006/0238864 A1 Oct. 26, 2006

(30) Foreign Application Priority Data
Feb. 7, 2005 (JP) .............................. 2005-030846

(51) Int. Cl.
*G02B 5/30* (2006.01)
(52) U.S. Cl. ..................... 359/484; 252/584; 252/585; 252/62.57
(58) Field of Classification Search ...................... None
See application file for complete search history.

(56) References Cited

U.S. PATENT DOCUMENTS 5,715,080 A * 2/1998 Scerbak ...................... 359/281
6,411,641 B1 * 6/2002 Shirai et al. .................... 372/98
6,965,191 B2 * 11/2005 Koike et al. ................... 313/112
7,068,864 B2 * 6/2006 Hanashima et al. ............ 385/6
2005/0207010 A1 * 9/2005 Tokano et al. ............... 359/501

FOREIGN PATENT DOCUMENTS

| JP | 07-281129 | 10/1995 |
| JP | 2000-066160 | 3/2000 |
| JP | 2004361757 A | * 12/2004 |

* cited by examiner

*Primary Examiner*—Arnel Lavarias
*Assistant Examiner*—Derek S. Chapel
(74) *Attorney, Agent, or Firm*—Dykema Gossett PLLC

(57) ABSTRACT

A Faraday rotator in which the isolation function based on a temperature rise is not deteriorated even when the Faraday rotator is used for a high output laser of not smaller than 1W output at a wavelength of not larger than 1.1 μm includes sapphire crystals or rutile crystals bonded as radiation substrates to the incident side and outgoing side of a bismuth substituted type rare earth metal iron garnet crystal (RIG) film, the thickness of the RIG film being not smaller than 130 μm and not larger than 200 μm.

5 Claims, 2 Drawing Sheets

FARADAY ROTATOR FOR HIGH OUTPUT LASERS

BACKGROUND OF THE INVENTION

1. Field of the Invention

The present invention relates to a Faraday rotator constituting an optical isolator used as an optical countermeasure against the reflection return beam from a high output laser used for optical communication and processing.

2. Description of Related Art

When a beam reflected on an optical surface and a processing surface of an outer portion of a laser resonator returns to a laser element in a semiconductor laser utilized for optical communication, a solid laser utilized for laser processing, and the like, the laser oscillation becomes unstable. When the laser oscillation becomes unstable, signal noise occurs in the case of the optical communication, and the breakage of the laser element in the case of the processing laser in some cases. Therefore, in order to intercept such a reflection return beam so that such a beam does not return to the laser element, an optical isolator is used. The optical isolator is usually made of a Faraday rotator, a polarizer, an analyzer and a permanent magnet.

The terbium gallium garnet crystals (which will hereinafter be referred to as TGG) and terbium aluminum garnet crystals (which will hereinafter be referred to as TAG) have been used as related art Faraday rotators for an optical isolator for a high output laser.

However, TGG and TAG have a small Faraday rotation coefficient per unit length. Therefore, in order to obtain a 45 degree angle of polarization for the purpose of using these crystals as optical isolators, it is necessary that an optical path length be increased. In practice, crystals having a length of as large as around 6 cm had to be used. In order to obtain a high optical isolation, a uniformly large magnetic field has to be exerted on the crystals, so a strong and large magnet was used. This caused the dimensions of the optical isolator to increase. Since the optical path length is large, the shape of a laser beam is deteriorated in the crystals in some cases, so that some kind of optics is needed for correcting the beam. Furthermore, since TGG is expensive, a small-sized, inexpensive Faraday rotator was demanded.

The Faraday rotation coefficient per unit length of a bismuth substituted type rare earth metal iron garnet crystal film (which will hereinafter be referred to as RIG film) used exclusively in the field of optical communication is noticeably large as compared with those of TGG and TAG, so that the optical isolator can be miniaturized greatly. However, it is known that, when the wavelength of light used by RIG becomes short to a level in the vicinity of 1.1 µm used for a processing laser, the light absorption of iron ions becomes high, and that the performance of the optical isolator is deteriorated due to a temperature rise caused by this optical absorption.

As a method of solving the problem of the temperature rise of the RIG film, the invention disclosed in JP-A-2000-66160 was proposed. The techniques disclosed in this document are the techniques for rendering it easy to radiate the heat occurring in the RIG film by leaving a $(GdCa)_3(GaMgZr)_5O_{12}$ substrate (which will hereinafter be referred to as GGG substrate) for growing the RIG film, which is usually removed rather than by being polished. Also, a method of holding both surfaces of a RIG film by transparent garnet substrates and radiating the heat of the RIG film via the garnet substrates of a high thermal conductivity is disclosed in JP-A-7-281129.

In the method disclosed in JP-A-2000-66160, the generation of heat due to the optical absorption in the RIG film becomes not lost, strain caused by the different thermal expansion coefficients of RIG film and GGG substrate combined with each other directly in one body occurs. As a result, birefringence occurs both in the RIG film and GGG substrate, so that, when the RIG film and GGG substrate are used for an optical isolator, the isolation function is deteriorated.

Unless the RIG film is polished by controlling the thickness thereof so that the Faraday rotation angle of the RIG film becomes accurately 45 degrees, the reflected light on an interface between the RIG film and GGG substrate cannot be removed completely by an incident side polarizer, and this reflected light returns to the laser element.

In the invention disclosed in JP-A-7-281129, a method is introduced of bringing a transparent substrate, such as a garnet substrate or a glass substrate into contact with one side or both sides of a RIG film or bonding the same transparent substrate thereto with an optical bonding glue. In the method of merely bringing the RIG film and transparent film into contact with each other, it is difficult to bring the RIG film and transparent film with each other uniformly in the whole of the region of the diameter of the incident laser beam, and an air layer necessarily exists on a non-contacting portion. In this case, an anti-reflection coating formed on the premise that the RIG film and transparent substrate contact each other does not function due to the air layer penetrating therebetween. As a result, large reflected light is made to occur to cause the reflected light to return to the laser element. Moreover, the heat radiating function lower.

When a laser beam having an output level which exceeds 1 W is put into the RIG film even in the method of bonding the RIG film and transparent substrate with an optical bonding glue, the temperature of the RIG film increases, and the Faraday rotation angle of the RIG film deviates from 45 degrees due to the temperature coefficient thereof, and the isolation function is deteriorated.

SUMMARY OF THE INVENTION

The present invention aims at providing a Faraday rotator the isolation function of which is not deteriorated even when the Faraday rotator is used with respect to a laser of a wavelength of not larger than 1.1 µm and a high output of not smaller than 1 W without causing the above-mentioned problems to occur.

The temperature coefficient of the Faraday rotation angle of the RIG film is from around 0.05 degrees/° C. to around 0.10 degrees/° C. In order to maintain the isolation function of the optical isolator at not smaller than 30 dB, it is necessary that a temperature rise of the RIG film be held down to around 20° C. to 30° C. Therefore, it is necessary that the calorific power of the RIG film be reduced, and that the heat generated be radiated quickly.

The garnet crystal is represented by a molecular formula of $A_3B_5O_{12}$. In the RIG film, Bi enters an A site, and iron enters a B site. Although it is possible to reduce the absorption coefficient by substituting the iron ions, which constitute a cause of optical absorption at a wavelength of not larger than 1.1 µm, with non-magnetic ions, such as Ga, not only the absorption coefficient but also the Faraday rotation coefficient (degree/cm) decreases. Even when the absorption coefficient of the RIG film decreases by substituting iron with Ga and the like, the Faraday rotation coefficient decreases, so that the thickness of the RIG film necessary to attain the Faraday rotation angle of 45 degrees has to be increased. Therefore, it is difficult to reduce the calorific value greatly by substituting iron with Ga and the like with the optical absorption of the RIG film not varied much.

When the iron is substituted with Ga and the like, the curie point lowers gradually on the contrary. When the curie point becomes lower than 200° C., the temperature coefficient of the Faraday rotation angle becomes low. Assuming that the iron content is reduced by substituting the iron with Ga and the like so as to solve the above problems, it was proven that lowering the iron content per molecular formula of 5 to around 0.6 is limitative.

When bismuth is added to the RIG film, the Faraday rotation coefficient increases. Therefore, an attempt to increase the quantity of bismuth is often made. However, when the quantity of bismuth of substitution in the A site of bismuth exceeds 1.2 per molecular formula in a RIG film grown by using a generally used GGG substrate the number of lattices of which is from 1.2490 nm to 1.2515 nm, the crystallinity is deteriorated, and the thickness of the RIG film necessary to attain the Faraday rotation angle of 45 degrees becomes excessively small. This makes it difficult to obtain a RIG film of a high flatness not having uneven thickness by polishing. Therefore, in order to hold down the calorific value, and not to cause the unevenness inside the surface of the Faraday rotation angle, it was proven that the thickness of the RIG film be set to from 130 µm to 200 µm.

Using a garnet substrate and a glass substrate in a related art Faraday rotator as a radiation substrate so as to radiate the generated heat quickly, a sufficient thermal conductivity is not obtained (the thermal conductivity of the garnet substrate is around 7 W/m·K at highest, and that of a general glass substrate 1 W/m·K), so that a transparent substrate of a higher thermal conductivity is needed. Concerning the characteristics of the substrate, such as the thermal conductivity and transparency, the crystals of diamond and SiC come to be preferable. However, in view of the process ability, easiness of obtainment, price and the like, it became clear that sapphire crystals and rutile crystals with heat conductance of 40 W/m·K or more were optimum.

In view of the above, sapphire crystals or rutile crystals are bonded as a radiation substrate to the incident side and outgoing side of the RIG film, and the thickness of the RIG film is set to not smaller than 130 µm and not larger than 200 µm in the present invention. As a result, the invention succeeded owing to the cooperation of such bonded crystals and thickness-increased RIG film in providing an object Faraday rotator for high output lasers for an optical isolator of an excellent isolation function.

As described above, it becomes possible to provide when the present invention is used as described above for a miniaturized inexpensive Faraday rotator capable of maintaining a high isolation effect when the invention is used for an optical isolator even though a laser of a high output of not lower than 1 W is used for the isolator.

DETAILED DESCRIPTION OF THE INVENTION

Figure 1:
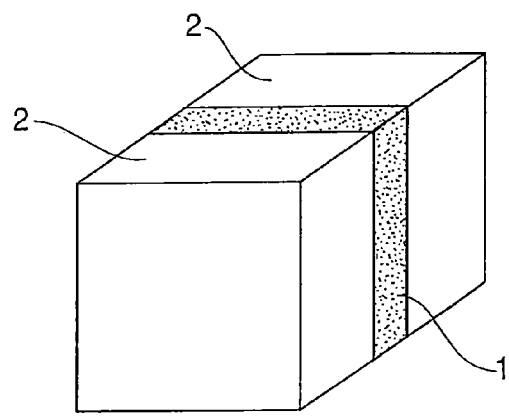
FIG. 1 is a sectional view of the Faraday rotator according to the present invention.

As described above, the Faraday rotator according to the present invention has sapphire crystals or rutile crystals bonded as a radiation substrate to the incident side and outgoing side of the RIG film, wherein the thickness of the RIG film is not smaller than 130 µm, and not larger than 200 µm, which constitutes the features of the present invention. The thickness of the radiation substrate is preferably not smaller than 0.2 mm and smaller than 1 mm since, when this thickness is smaller than 0.2 mm, it is difficult to display a satisfactory radiation effect; and when the thickness is not smaller than 1 mm, the processability lowers. The thickness of the radiation substrate is preferably not smaller than 0.2 mm and smaller than 0.5 mm.

When the RIG film and radiation substrate are bonded to each other in the present invention, a bonding reflection preventing film for the bonding glue is applied in advance to the surfaces to be bonded of the RIG film and radiation substrate. The bonding glue is preferably made of an epoxy resin having an absorption coefficient of not larger than 0.1 cm$^{-1}$ at a wavelength in use. A bonding glue in use made of a bonding glue absorbing an incident laser beam encounters the generation of heat therein and not preferable. When the absorption coefficient is not higher than 0.1 cm$^{-1}$, the optical absorption in the bonding glue layer is negligibly low, and this bonding glue does not become an issue.

When the RIG film and two radiation substrate substrates are bonded together with an epoxy bonding glue, it is preferable to apply a pressure from the above so that the thickness of the bonding glue layer becomes not larger than 10 µm. The reason resides in that, when the thickness of the bonding glue layer is small, the heat occurring in the RIG film is easily transmitted to the radiation substrates.

When the RIG film and radiation substrates are bonded together, they may be bonded together after they are cut into chip type pieces. When the radiation substrates are made of parallel flat plates, the RIG film and radiation substrates in a large-area state may be bonded together and then cut into chips of a necessary sizes by a dicing saw and the like. The reason resides in that the bonding operation for preparing a plurality of Faraday rotator chips may be carried once. When the radiation substrates are made of rutile crystals and have wedge type shapes, a method may be carried out of cutting RIG film into strip type pieces, pasting the cut pieces on the wedge type and strip type rutile crystals, and then cutting the resultant products into chips.

When the Faraday rotator thus prepared is incorporated into an optical isolator, the Faraday rotator is preferably covered with a heat sink so as to promote the radiation of heat. When the outer circumference only of the Faraday rotator is covered with the heat sink with a laser output becoming near 2 W, the radiation ability becomes unsatisfactory, so that it is more preferable to bring the portion as well of the incident surface of the Faraday rotator which does not receive the laser beam into thermal contact with the heat sink. It is effective to bring the heat sink and Faraday rotator into contact with each other if possible. When thermally conductive grease is used in the clearance between the heat sink and Faraday rotator, a thermal transfer effect becomes large. The heat sink may be made of a magnet magnetically saturating the RIG film.

EXAMPLE (Manufacturing of Faraday Rotator)

The assembling of the Faraday rotator in the embodiment will now be described by using FIG. 1.

A RIG film 1 of 11 mm×11 mm polished to a thickness of 140 μm so that a Faraday rotation angle becomes 45° with respect to the light of 1064 nm which is the oscillation wavelength of YAG laser, and thereafter applying an anti-reflection coating (not shown) against the bonding glue to both surfaces of the RIG film is prepared. The insertion loss of the RIG film 1 with respect to the light of 1064 nm was 0.6 dB.

A C-surface sapphire substrate 2 of 11 mm×11 mm and 0.5 mm in thickness identical with the dimensions of the RIG film was used as a radiation substrate. An anti-reflection coating with respect to 1064 nm light was applied to the sapphire substrate as well. An anti-reflection coating for glue (not shown) was provided on the RIG film-bonding surface of the radiation substrate, and an anti-reflection coating for air (not shown) on the other surface.

The RIG film 1 and two sapphire substrates 2 bonded with an optical epoxy glue so that the sapphire substrate, a RIG film and a sapphire substrate are laminated in the mentioned order. The absorption coefficient of the used bonding glue with respect to the 1064 nm light was about 0.08 $cm^{-1}$, and the thickness of the bonding glue layer 5 μm.

The Faraday rotator thus obtained was cut with a dicing saw into nine Faraday rotator chips of 3 mm in square. (the manufacturing and evaluation of optical isolator).

Figures 2A, 2B:
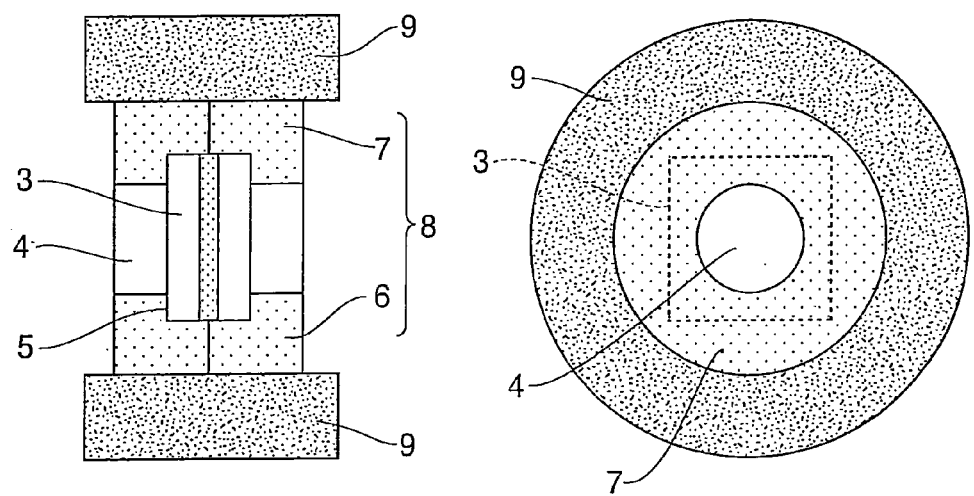
FIG. 2A is a sectional view of an example of an isolator used in the present invention.
FIG. 2B is a front view of an example of the isolator used in the present invention.

The assembling of the optical isolator will now be described by using the example drawing in FIGS. 2A and 2B.

A Faraday rotator chip 3 obtained in the manner as mentioned above is held in a recess of a brass holder 6, in which a through hole 4 of 2 mm in diameter and a recess 5 of 3 mm in square are formed, and held between the holder 6 and a holder 7 to form the heat sink 8, the shape of the holder 7 is identical with that of the holder 6, these holders 6, 7 being fixed to each other by solder. The holders 6, 7 were plated with gold in order to obtain a good solderability. Heat transfer paste was applied to the contact portions of the Faraday rotator chip 3 and holders 6, 7.

The heat sink 8 in which the Faraday rotator chip 3 is held therein is inserted into the through hole of the cylindrical Sm—Co magnet 9, and a clearance between the heat sink 8 and holder 7 is filled with high-temperature heat conductive silver paste (not shown). The filling of the silver paste in this manner enables the Sm—Co magnet as well to be functioned as a heat sink.

Figure 3:
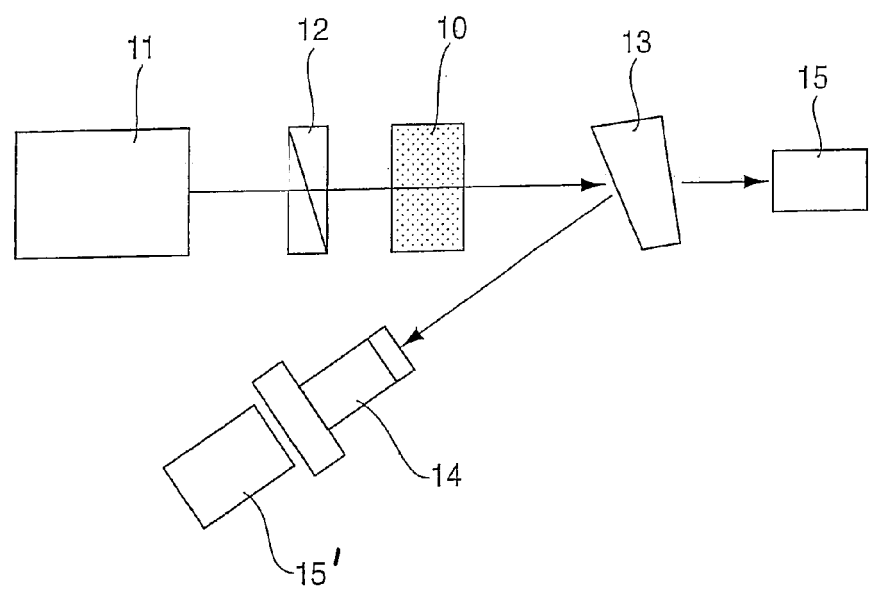
FIG. 3 is a drawing showing an optical system by which the variation of the Faraday rotation angle based on a temperature rise.

The characteristics of the Faraday rotator unit 10 in which the Faraday rotator chip, heat sink and Sm—Co magnet are combined together in one body was evaluated by an optical system shown in FIG. 3. A laser 11 emits a beam 2 W Nd:YAG, 1064 nm in wavelength, 1 mm in beam diameter which is directed into a polarizer 12 which converts the beam into a linearly-polarized beam, which is then directed through the Faraday rotator unit 10 to a glass wedge 13, a portion passing through to an optical power meter 15 and a portion reflecting to a rotating rotary stage-carrying optical analyzer 14 and optical power meter 15', to discover that the Faraday rotation angle varied by only about 0.9 degrees. Since the temperature coefficient of the Faraday rotation angle in the vicinity of room temperature of the used RIG film is 0.06 degrees/° C., a temperature rise based on the absorption of the laser beam was about 15° C.

The optical isolator is formed by inserting the Faraday rotator unit between the polarizer of an extinction ratio of 40 dB and optical analyzer, and, when Nd:YAG laser beam of 2 W in laser output was put in the optical isolator in the reverse direction, isolation of isolation 30 dB could be maintained.

Even when the radiation substrate of rutile substrate instead of the sapphire substrate is used as the radiation substrate in the above-described embodiment, substantially the same effect as mentioned above could be obtained.

Since the Faraday rotator according to the present invention is capable of radiating effectively the heat occurring in the RIG film, the invention can be utilized widely as a Faraday rotator for a high output laser for the optical communication and laser processing.

What is claimed is:

1. A Faraday rotator for a high output laser comprising a bismuth substituted rare earth metal iron garnet (RIG) film defining an incident side surface and an outgoing side surface, and first and second C-surface sapphire substrates respectively bonded to said incident and outgoing side surfaces to form radiation substrates on said RIG film, a thickness of the RIG film being not smaller than 130 μm and not larger than 200 μm.

2. The Faraday rotator for a high output laser according to claim 1, wherein a thickness of each of the first and second radiation substrates is not smaller than 0.2 mm and not larger than 1 mm.

3. The Faraday rotator for a high output laser according to claim 1, wherein a bonding glue bonds the first and second radiation substrates to the RIG film, said bonding glue comprising an epoxy resin having an absorption coefficient which is not larger than 0.1 $cm^{-1}$ at a wavelength in use.

4. The Faraday rotator for a high output laser according to claim 1, wherein the RIG film and the first and second radiation substrates are respectively bonded together by an epoxy glue layer having a thickness not larger than 10 μm.

5. An optical isolator comprising the Faraday rotator defined in claim 1, wherein a side surface of the Faraday rotator other than laser beam transmission portions thereof is covered with a heat sink.

* * * * *